UNITED STATES PATENT OFFICE.

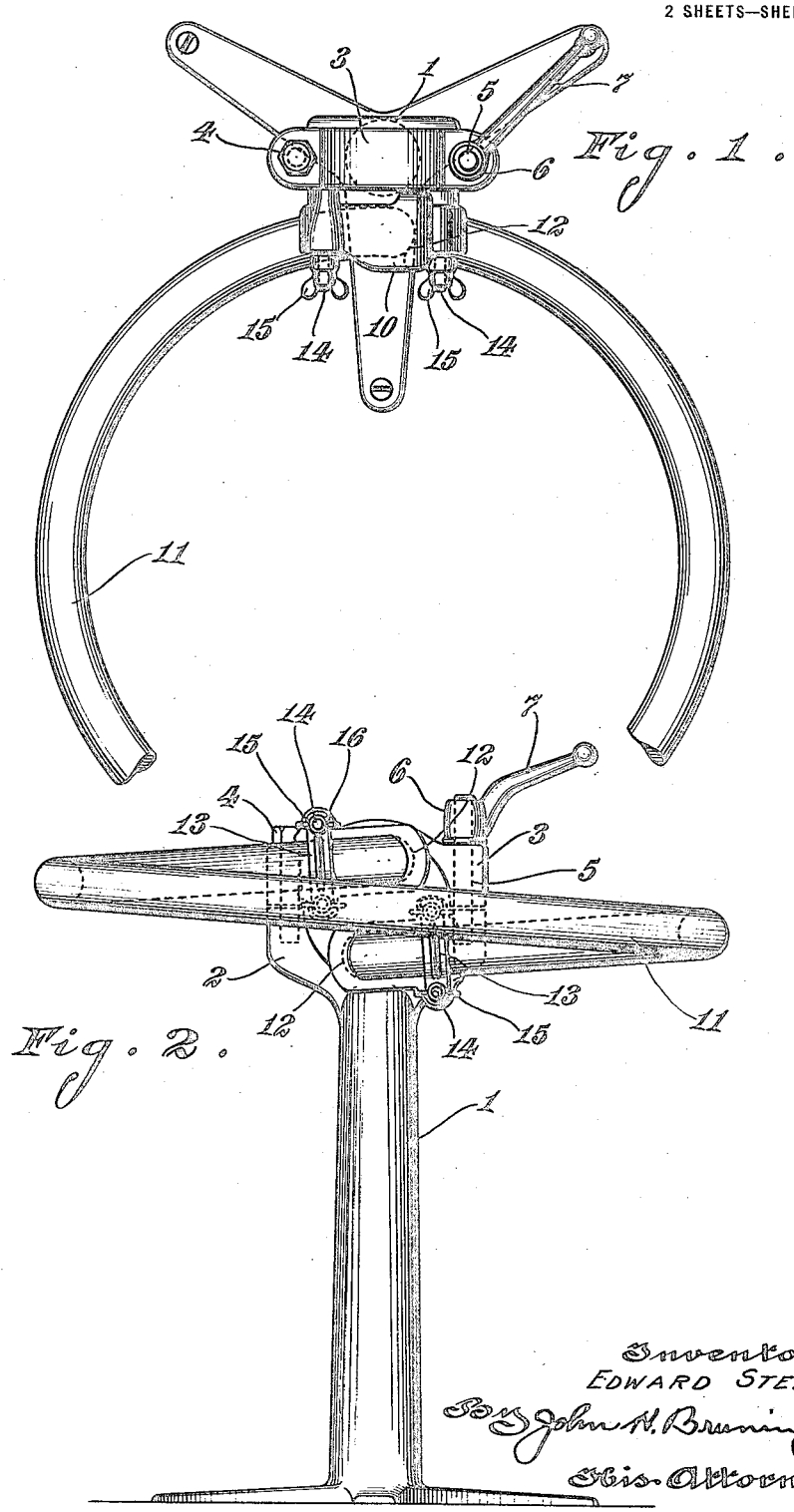

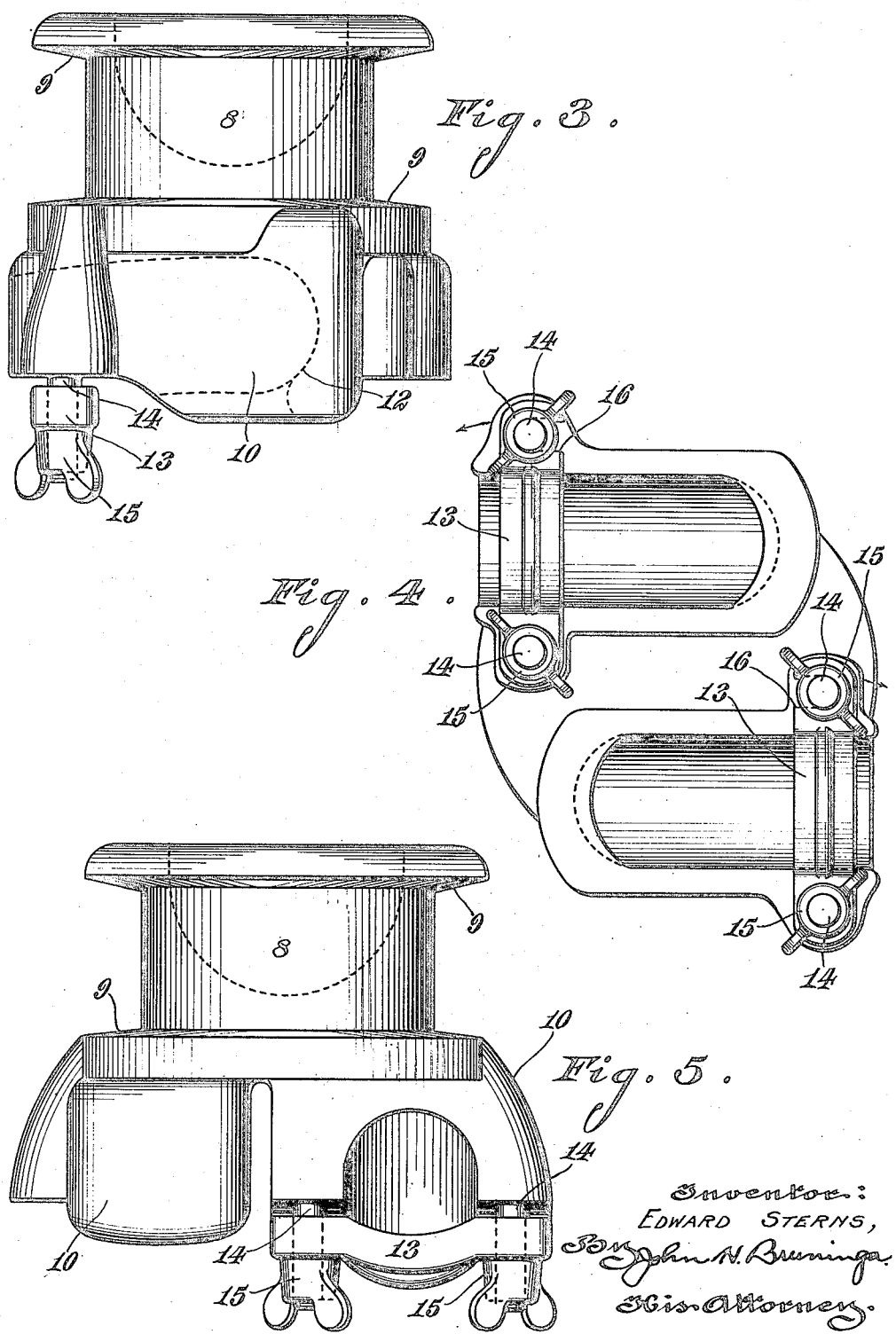

EDWARD STERNS, OF ST. LOUIS, MISSOURI, ASSIGNOR, BY MESNE ASSIGNMENTS, TO SURETY TIRE & RUBBER COMPANY, OF WILMINGTON, DELAWARE, A CORPORATION OF DELAWARE.

TIRE-MAKING DEVICE.

1,348,596.      Specification of Letters Patent.      Patented Aug. 3, 1920.

Application filed September 4, 1917. Serial No. 189,691.

*To all whom it may concern:*

Be it known that I, EDWARD STERNS, a citizen of the United States, and residing at St. Louis, Missouri, have invented new and useful Improvements in Tire-Making Devices, of which the following is a specification.

This invention relates to a device for making tires.

In making tires, more particularly inner tubes, the material is wrapped around a mandrel, so as to form a tube; the tube is then pulled off of the mandrel, the ends joined or spliced, and the whole is then vulcanized.

One of the objects of this invention is to provide a tire making device in which the mandrel is supported on a suitable base, but arranged to permit removal of the tire from the mandrel.

Another object is to provide a tire making device in which the mandrel is so mounted on a suitable base as to permit the wrapping operation to be effectively and conveniently performed.

Further objects will appear from the detail description taken in connection with the accompanying drawing, in which, Figure 1 is a plan of a tire making device embodying this invention;

Fig. 2 is a front elevation;

Fig. 3 is an enlarged detail front elevation of the base and carrier;

Fig. 4 is an enlarged detail plan view; and,

Fig. 5 is an enlarged detail end view.

Referring to the accompanying drawing, 1 designates a base provided with a head 2 having a removable cap 3 adapted to form a bearing. This cap is secured on one side by a screw 4 passing through the cap and into the head, and mounted in the other end of the head is a stud 5 passing through the cap, and provided with a nut 6, having a handle 7.

Mounted in the head is a carrier provided with an axle 8, adapted to be positioned in the bearing formed by the head and the cap, and having shoulders 9 to restrain endwise movement of the carrier in the base. This carrier is provided with bosses 10, which are channeled to receive the ends of a mandrel 11. This mandrel is of circular form, and the ends thereof are arranged in spaced relation and out of alinement, so as to overlap. These ends are received in the channels and the channels are undercut, as shown at 12. The ends of the mandrel are secured in position by caps 13, which are mounted on threaded studs 14 in the bosses 10, upon which are mounted wing nuts 15 to secure the caps in position. One hole in each cap is slotted and open, as shown at 16, to permit the cap to swing on the other stud.

With the mandrel mounted on the carrier and clamped in position by the clamps and wing nuts, this mandrel is retained in a convenient position to permit ready application of the material upon the mandrel. During the wrapping operation, the mandrel can be turned on its axle to present the work in convenient position to the workman, and this mandrel can be clamped in any swiveled position by the clamping device 7. After the wrapping of the tube has been completed, the mandrel can readily be removed from its carrier by loosening the wing nuts, and by swinging the caps 13 on their lower studs 14, so as to permit withdrawal of the tube from the mandrel.

It is obvious that various changes may be made in the details of construction without departing from the spirit of this invention. It is, therefore, to be understood that this invention is not to be limited to the specific construction shown and described.

Having thus described the invention, what is claimed is:

1. A tire making device comprising, a base, a split tire mandrel, and means for detachably connecting said mandrel with said base adapted to permit endwise removal of the tire from said mandrel.

2. A tire making device comprising, a base, a split circular tire mandrel, and means connecting the ends of said mandrel with said base.

3. A tire making device comprising, a base, a split circular tire mandrel having its ends arranged in spaced relation, and means for connecting the ends of said mandrel with said base adapted to permit removal of the tire from said mandrel.

4. A tire making device comprising, a base, a carrier mounted for adjustment on said base, and a split circular tire mandrel mounted at its circumference on said carrier.

5. A tire making device comprising, a base, a carrier having an axle swiveled in said base, and a split circular tire mandrel mounted at its circumference on said carrier.

6. A tire making device comprising, a base, a carrier mounted for adjustment on said base, and a split circular tire mandrel detachably connected at its circumference with said carrier, adapted to permit removal of the tire from said mandrel.

7. A tire making device comprising, a base, a carrier mounted for adjustment on said base, a split circular tire mandrel having its ends arranged in spaced relation, and means for detachably connecting the ends of said mandrel with said carrier.

In testimony whereof I affix my signature this 31st day of March, 1917.

EDWARD STERNS.